(12) United States Patent
Bennett et al.

(10) Patent No.: US 8,868,833 B1
(45) Date of Patent: Oct. 21, 2014

(54) PROCESSOR AND CACHE ARRANGEMENT WITH SELECTIVE CACHING BETWEEN FIRST-LEVEL AND SECOND-LEVEL CACHES

(75) Inventors: David W. Bennett, Longmont, CO (US); Jeffrey M. Mason, Eldorado Springs, CO (US)

(73) Assignee: IOnU Security, Inc., Longmont, CO (US)

( * ) Notice: Subject to any disclaimer, the term of this patent is extended or adjusted under 35 U.S.C. 154(b) by 431 days.

(21) Appl. No.: 13/196,398

(22) Filed: Aug. 2, 2011

(51) Int. Cl.
*G06F 12/02* (2006.01)

(52) U.S. Cl.
USPC ............ 711/122; 711/118; 711/138; 711/163; 711/167

(58) Field of Classification Search
USPC .......................... 711/122, 118, 138, 163, 167
See application file for complete search history.

(56) References Cited

U.S. PATENT DOCUMENTS

| | | | |
|---|---|---|---|
| 4,755,930 A | 7/1988 | Wilson, Jr. et al. | |
| 6,085,288 A * | 7/2000 | Arimilli et al. | 711/118 |
| 6,341,336 B1 | 1/2002 | Arimilli et al. | |
| 7,461,210 B1 | 12/2008 | Wentzlaff et al. | |
| 7,774,553 | 8/2010 | Agarwal et al. | |
| 7,805,575 B1 | 9/2010 | Agarwal et al. | |
| 7,814,242 B1 | 10/2010 | Wentzlaff | |
| 7,853,752 B1 | 12/2010 | Agarwal et al. | |
| 7,853,754 B1 | 12/2010 | Agarwal et al. | |
| 7,853,755 B1 | 12/2010 | Agarwal et al. | |
| 7,882,307 B1 | 2/2011 | Wentzlaff et al. | |
| 2010/0333096 A1 * | 12/2010 | Dice et al. | 718/102 |

OTHER PUBLICATIONS

Lin Li, N. Vijaykrishnan, Mahmut Kandemir, Mary Jane Irwin and Ismail Kadayif, "CCC: Crossbar Connected Caches for Reducing Energy Consumption of On-Chip Multiprocessors," IEEE Proceedings of the Euromicro Symposium on Digital System Design (DSD'03) (2003).

* cited by examiner

*Primary Examiner* — Jae Yu
(74) *Attorney, Agent, or Firm* — Crawford Maunu PLLC (57) ABSTRACT

Approaches for caching addressable items in a multiprocessor system. Instructions are cached in a plurality of first-level instruction caches respectively coupled to a plurality of processors of the multiprocessor system. First-type data items are cached in a plurality of first-level data caches respectively coupled to the plurality of processors. Second-type data items are cached in a second-level cache and are not cached in any of the plurality of first-level data caches.

11 Claims, 7 Drawing Sheets

PROCESSOR AND CACHE ARRANGEMENT WITH SELECTIVE CACHING BETWEEN FIRST-LEVEL AND SECOND-LEVEL CACHES

FIELD OF THE INVENTION

One or more embodiments generally relate to processor and multi-level cache arrangements.

BACKGROUND

In an effort to increase computing capacity and throughput, computer makers have made multi-processor systems for decades. A common multi-processor architecture has multiple instruction processors having access to a shared memory, along with a multi-level cache hierarchy. Continued advancement has allowed multi-processor systems to be implemented as multi-core processors, allowing deployment on desktops and in other applications where space is limited. Each "core" is an instruction processor. A multi-core processor may have multiple instruction processors on a single die or in a single semiconductor package.

In some multi-core processor architectures there is no direct channel for communicating between cores, and inter-core communication is accomplished by way of shared memory. Though a multi-core processor architecture may have a cache arrangement including first-level caches and a second-level cache, use of the shared memory for inter-core communication may negatively impact performance.

Maintaining cache coherency between the first-level caches will consume many processor cycles, and the number of processor cycles spent maintaining cache coherency will multiply with frequent access to the shared memory for purposes of inter-core communication.

SUMMARY

In one embodiment a processor arrangement includes a plurality of processors, a plurality of first-level caches, at least one second-level cache, at least one shared memory, and addressing circuitry. The caches of the plurality of first-level caches are coupled to the plurality of processors, respectively. The second-level cache is coupled to the plurality of first-level caches. The shared memory is coupled to the second-level cache for storing a plurality of addressable items. Each addressable item has an associated cache control tag. The addressing circuitry is coupled to the first-level caches and to the second-level cache. The addressing circuitry is configured to cache an addressable item requested by the respective processor in one of the first-level caches in response to a first value of the cache control tag associated with the addressable item. The addressing circuitry is further configured, in response to a second value of the cache control tag associated with an addressable item requested by one of the processors, to bypass caching of the addressable item in any of the first-level caches and cache the addressable item in a second-level cache.

In another embodiment, a processor arrangement includes a plurality of processors, a plurality of first-level instruction caches coupled to the plurality of processors, a plurality of first-level data caches coupled to the plurality of processors, respectively, at least one second-level cache coupled to the plurality of first-level instruction caches and to the plurality of first-level data caches, and at least one shared memory coupled to the second-level cache for storing a plurality of data items. Each data item has an associated cache control tag. Cache control circuitry is coupled to the plurality of processors, to the plurality of first-level caches, and to the second-level cache. The cache control circuitry, responsive to a request from one of the plurality of processors for access to a data item, is configured to cache the data item in the respective one of the plurality of first-level caches in response to a first value of the cache control tag associated with the data item. The cache control circuitry is further configured to cache the data item in the second-level cache and not in any of the plurality of first-level caches in response to a second value of the cache control tag associated with the data item.

A processor arrangement in another embodiment includes a plurality of processors, a plurality of first-level instruction caches coupled to the plurality of processors, a plurality of first-level data caches coupled to the plurality of processors, respectively, a crossbar-connected first-level cache coupled to the plurality of processors, at least one second-level cache coupled to the plurality of first-level instruction caches, to the plurality of first-level data caches, and to the crossbar-connected first-level cache, and at least one shared memory coupled to the second-level cache for storing a plurality of data items. Each data item has an associated cache control tag. Cache control circuitry is coupled to the plurality of processors, to the plurality of first-level data caches, to each second-level cache, and to the crossbar-connected first-level cache. The cache control circuitry, responsive to a request from one of the plurality of processors for access to a data item, is configured to cache the addressable item in the respective one of the plurality of first-level data caches and not in the crossbar-connected first-level cache in response to a first value of the cache control tag associated with the data item. The cache control circuitry caches the addressable item in the crossbar-connected first-level cache and not in any of the plurality of first-level data caches in response to a second value of the cache control tag associated with the data item.

A method for caching addressable items in a multiprocessor system is provided in another embodiment. The method includes caching instructions in a plurality of first-level instruction caches that are respectively coupled to a plurality of processors of the multiprocessor system. First-type data items are cached in a plurality of first-level data caches that are respectively coupled to the plurality of processors. Second-type data items are cached in a second-level cache and not caching the second-type data items in any of the plurality of first-level data caches.

It will be appreciated that various other embodiments are set forth in the Detailed Description and Claims which follow.

BRIEF DESCRIPTION OF THE DRAWINGS

Various aspects and advantages of the disclosed embodiments will become apparent upon review of the following detailed description and upon reference to the drawings in which.

DETAILED DESCRIPTION

In one or more embodiments, a multi-processor arrangement includes multiple instruction processors, respective first-level caches coupled to the processors, and a one or more second-level caches coupled to the first-level caches. Addressable items that are private to a processor are stored in the respective first-level cache. Addressable items that are shared between processors are stored in the second-level cache and excluded from storage in any of the first-level caches. Generally, a private addressable item is one in which accessing the addressable item by one processor in a first-level cache would not require cache coherency circuitry to provide the updated data to another first-level cache for another processor. Private addressable items include those to which only one processor has write access, read-only data, constants, the stack associated with a thread, etc. A shared addressable data item is one to which at least one of the processors has write access (or write and read access) and at least one other of the processors has read and/or write access.

Data items that are to be treated as private data and data items that are to be treated as shared data may be identified during compilation of program source code. identifying shared and private data items may be accomplished through source code analysis or explicit declarations in the source code, for example.

Figure 1:
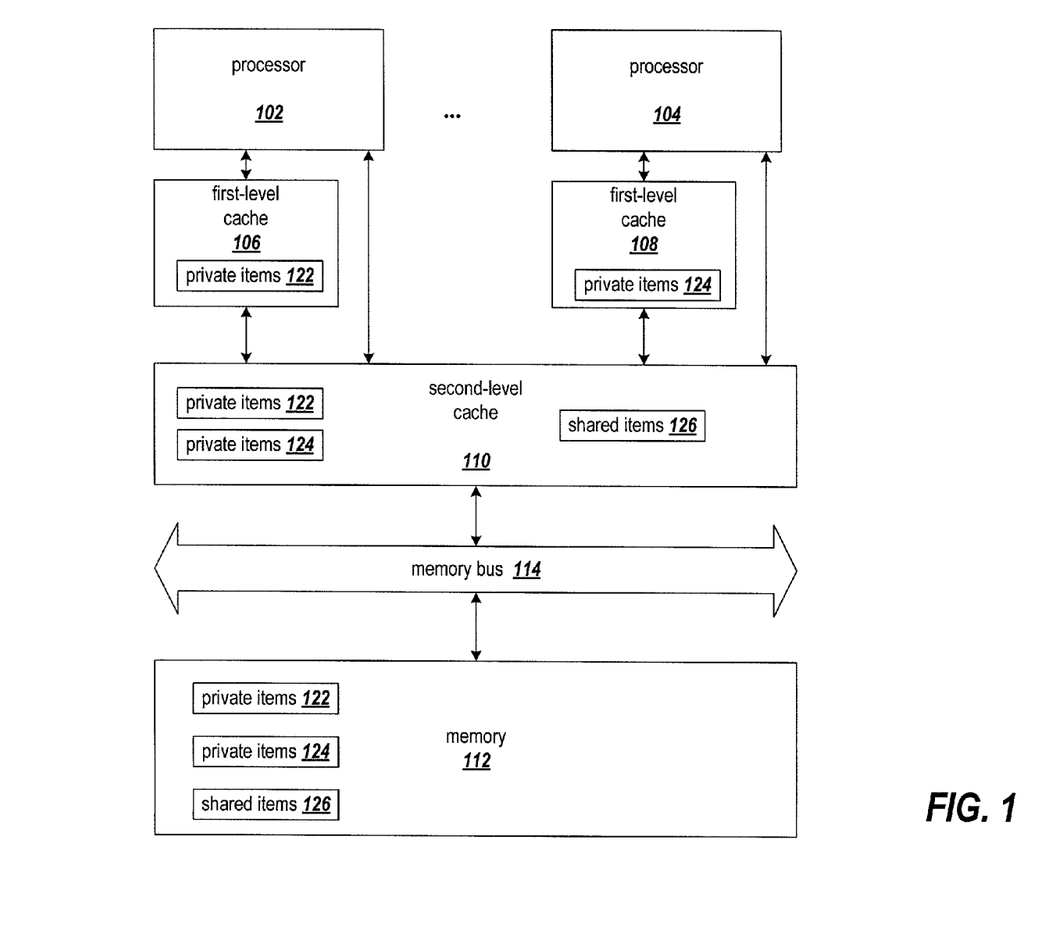
FIG. 1 shows a processor arrangement having a multi-level cache hierarchy.

FIG. 1 shows a processor arrangement having a multi-level cache hierarchy. The system of FIG. 1 shows how different attributes of addressable items may be used to control at which level of the cache hierarchy the item is stored. Since the figure does not depict separate instruction and data caches, though many architectures have separate caches for instructions and data, the description of this figure uses addressable item(s) to refer to either instructions or data.

Since cache coherency would not be involved when a processor accesses read-only data, constants, the stack associated with a thread, etc., this data is treated as private data and cached in the first-level cache of that processor. In some embodiments, instructions may be considered read-only data. Shared addressable items are not stored in the first-level caches. Generally, addressable items that are classified as shared items are accessed by a processor via a path to the second-level cache that bypasses the first-level cache, and addressable items that are classified as private items are accessed by a processor via the first-level cache. Improved performance may be achieved because processor cycles need not be spent on cache coherency for private addressable items in the first-level caches, and the shared items are not stored in the first-level caches. It will also be appreciated that coherency circuitry may be eliminated, which would save silicon resources and may allow the processors and caches to operate at a greater clock rate than if coherency circuitry were present.

The processor arrangement includes multiple processors, for example 102 and 104, respective first-level caches 106 and 108, one or more second-level caches 110, and one or more shared memories 112 coupled to the second-level cache via a memory bus 114. Each of the processors executes instructions, which are fetched from memory 112 via the second-level cache 110. Data stored in the memory 112 is accessed in executing the instructions by way of the second-level cache, and for private items via the first-level cache. The lines connecting the circuit blocks include address, data, and control lines. Each of the first-level caches and the second-level cache includes memory and associated cache control circuitry (not shown).

In the example, the shared memory 112 stores private items 122, private items 124, and shared items 126. The private items 122 are addressable items that are private to processor 102, the private items 124 are addressable items that are private to processor 104, and shared items 126 are addressable items to which at least one of processors 102 and 104 has write access (or write and read access) and at least one other of the processors has read and/or write access. Even though private items 122 and 124 are shown as distinct sets, it should be understood that private items such as constants and read-only data may be common to the private items of two or more processors.

The private items 122 and 124, along with the shared items 126, are cached in the second-level cache 110. Only private items 122 and 124 are cached in the first level caches. Private items 122 are cached in first-level cache 106 for processor 102, and private items 124 are cached in first-level cache 124 for processor 104. No processor cycles are expended on cache coherency between first-level caches 106 and 108 since the first-level caches store only private addressable items. Access to shared data is through the second-level cache 110.

Figure 2:
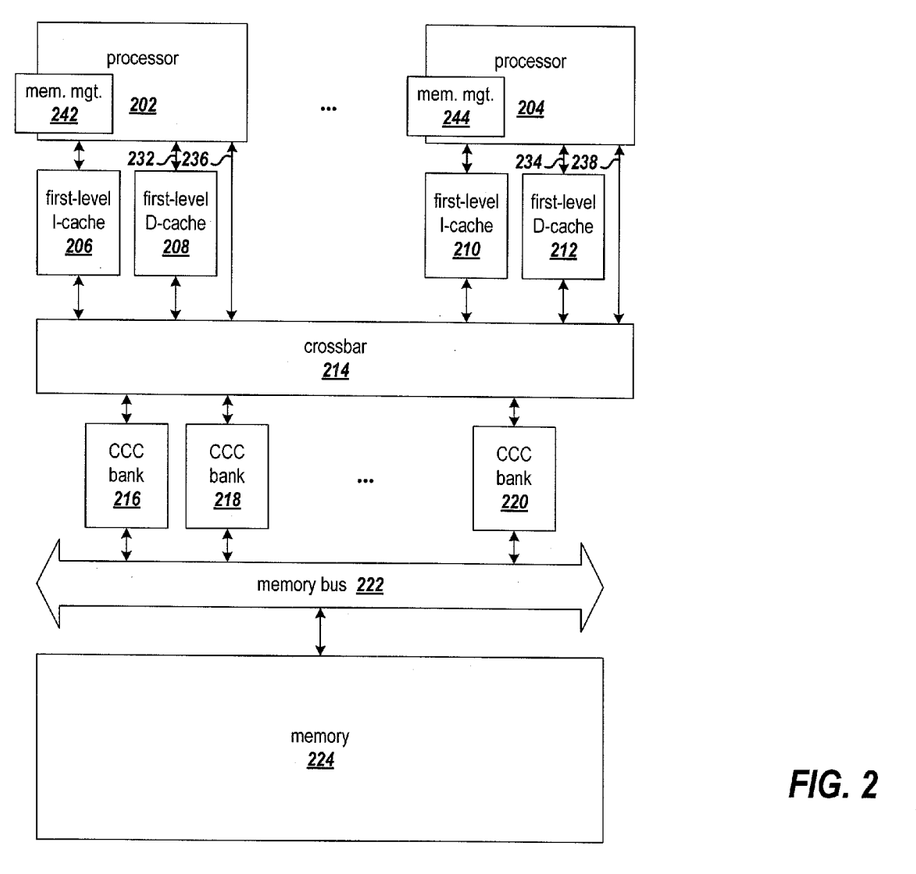
FIG. 2 shows a processor arrangement having a multi-level cache hierarchy in which a second-level cache is implemented as a crossbar-connected cache (CCC), and only private data is cached in first-level data caches.

FIG. 2 shows a processor arrangement having a multi-level cache hierarchy in which a second-level cache is implemented as a crossbar-connected cache (CCC), and only private data is cached in first-level data caches. Since the embodiment of FIG. 2 includes separate instruction caches (I-caches) and data caches (D-caches), the description uses instructions and data when referring to cacheable items. The processor arrangement includes multiple processors, for example 202 and 204, respective first-level I-caches 206 and 210 and D-caches 208 and 212, and a crossbar-connected cache (CCC), which includes a cross-bar switch 214 and multiple CCC banks 216, 218, and 220. The CCC banks are coupled to a shared memory 224 via a memory bus 222. The lines connecting the circuit blocks include address, data, and control lines. The processors include respective memory management circuits, for example, 242 and 244, and each of the first-level caches and CCC includes memory and associated cache control circuitry (not shown).

The first-level D-caches 208 and 212 store private data accessed by the processors 202 and 204, respectively. Private data include data to which only one processor has write access, read-only data, constants, the stack associated with a thread, etc. In response to a processor, for example, 202, seeking access to data that is private data, the memory management circuit 242 of that processor directs the request to the first-level D-cache 208. If the requested data is present in the first-level D-cache, it is accessed per the request (e.g., read or written). If the requested data is not present, the request is passed to the crossbar switch 214 of the CCC, and the data is accessed in one of the CCC banks 216 and 218 through 220. If the requested data is not present in the addressed one of the CCC banks, the request is forwarded to the main memory 224 via the memory bus 222. The data associated with a read request is returned to the processor 202 via the addressed one of the CCC banks and the first-level D-cache, which are updated accordingly.

Shared data is not cached in the first-level D-caches but is cached in the CCC banks 216, 218, and 220. In response to a processor, for example, 202, seeking access to shared data, the memory management circuit 242 of that processor bypasses the first-level D-caches and directs the request to the crossbar switch 214 of the CCC. If the requested data is not present in the addressed bank of the CCC, the request is forwarded to the main memory 224 via the memory bus 222. The data associated with a read request is returned to the processor 202 via the addressed one of the CCC banks, bypassing the first-level D-cache. The CCC bank is updated accordingly in response to a cache miss.

Memory management circuits in the processors, for example 242 and 244, determine which path to use to retrieve data based on a cache control bit that is associated with the requested address in the translation look-aside buffer (TLB) of the memory management circuit. Just as there is a bit to identify whether a page is read-only, such as for program instructions, there is also a bit to indicate whether the page is shared or private. Any data (or instruction) that is read-only for all processors is by definition not shared. This flag in the TLB tells the memory management circuit which path to use to access the data, the path to the first-level D-cache (private data path) or the path to the CCC (shared data path), which bypassed the first-level D-cache.

The CCC, which includes crossbar switch 214 and CCC banks 216 and 218 through 220, may be a CCC as described in the paper, entitled, "CCC: Crossbar Connected Caches for Reducing Energy Consumption of On-Chip Multiprocessors," by Lin et al., 2003. The selection of which of the CCC banks 216 and 218 through 220 a processor's request is sent is based on the address of the data being accessed. In one embodiment, the bank may be selected by masking certain bits in the address. For example, high-order bits may be used as a tag for the specific line that is held in the cache, the bits just below may identify the address into the cache memory of where the line is held, the bits just below that may identify the particular bank, and the least significant bits may identify the offset within a line of a particular byte of data. The crossbar switch 214 may be configured with logic circuitry to direct the request to the proper one of the CCC banks. In one embodiment, each bank of the CCC is implemented as a set-associative cache.

Figure 3:
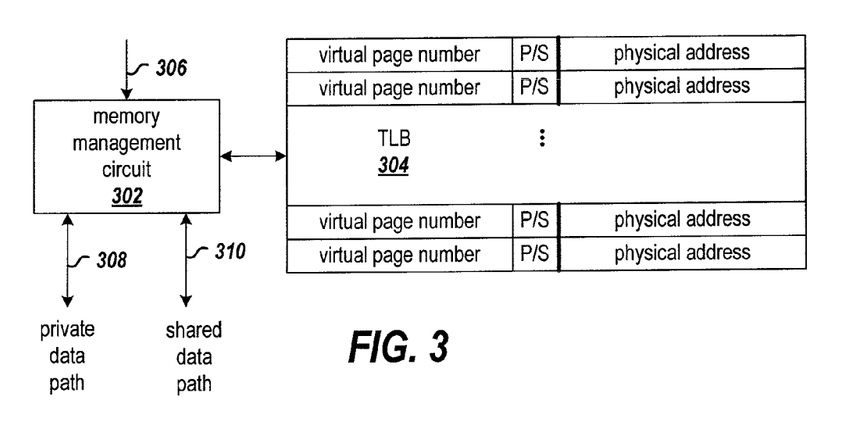
FIG. 3 shows an example of a memory management circuit and a translation look-aside buffer (TLB)

FIG. 3 shows an example of a memory management circuit 302 and a translation look-aside buffer (TLB) 304. The memory management circuit receives requests containing virtual page numbers from the instruction processing pipeline logic (not shown) of a processor on line 306. The TLB contains a mapping of virtual page numbers to physical addresses of the pages. In addition, in an example implementation each virtual page number has an associated cache control tag that designates whether the data item is private or shared (shown as P/S).

Figure 4:
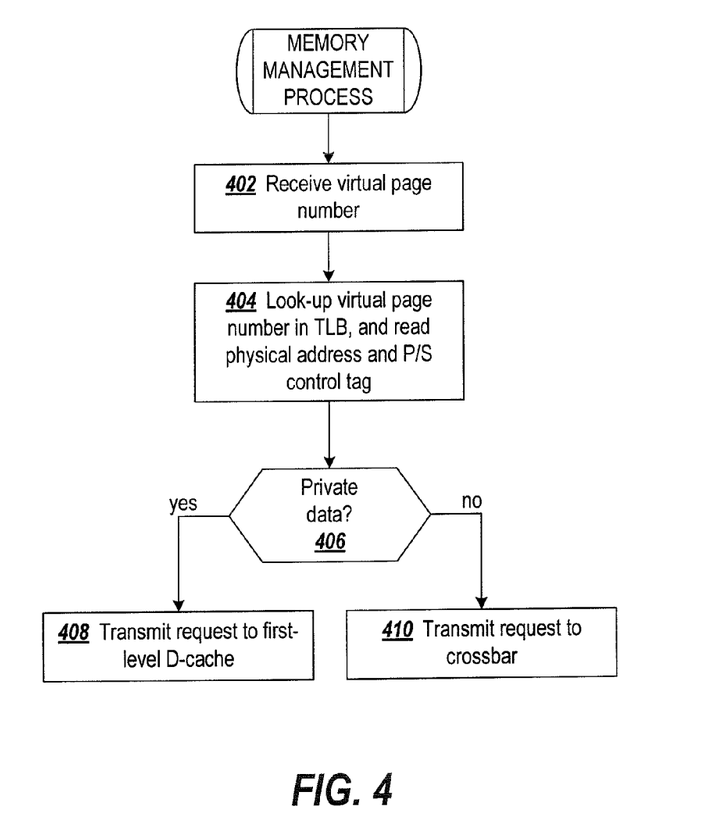
FIG. 4 is a flowchart of an example process performed by the memory management circuit in processing a request for access to a data item; shows a processor arrangement having a multi-level cache hierarchy in which a second-level cache is implemented as a crossbar-connected cache, and the processors, memory management circuits, and CCC banks use a cached/uncached designator bit to control caching of a data item between the first-level data cache and the second-level CCC.

FIG. 4 is a flowchart of an example process performed by the memory management circuit in processing a request for access to a data item. The depicted process is not intended to cover all processing performed by a memory management circuit. Rather, the figure is intended to illustrate the processing relevant to the designation of data items as either private or shared. For an input page number at block 402, the memory management circuit looks up the physical address that is mapped to that page number in the TLB at block 404. The physical address of the page and the associated value of the P/S control tag are read from the TLB at block 404. If the referenced data is private (decision block 406), the memory management circuit transmits the request on the private data path to the first-level D-cache at block 408. In FIG. 3, the private data path is shown as line 308. If the referenced data is shared, the memory management circuit transmits the request on the data path for shared data to the crossbar switch at step 410. in FIG. 3, the shared data path is shown as line 310. From FIG. 2 it will be recognized that the shared data paths bypass the first-level D-caches. In FIG. 2, the private data paths are shown as lines 232 and 234, and the shared data paths are shown as lines 236 and 238 for processors 202 and 204, respectively.

Figure 5:
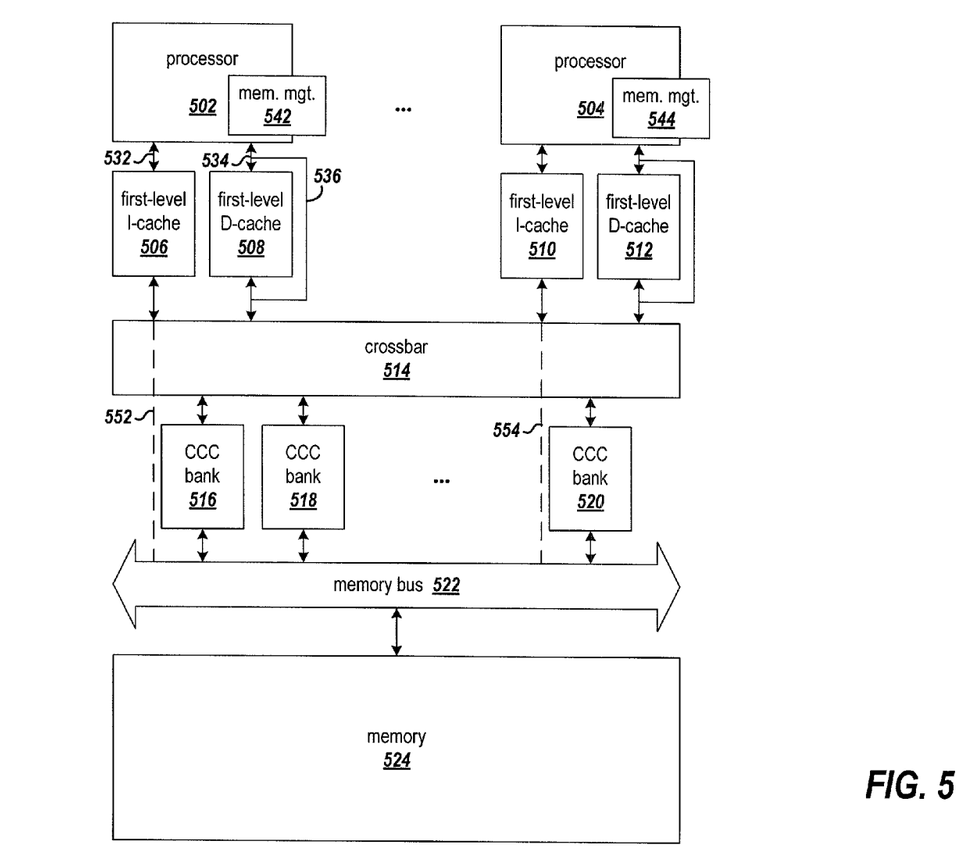

FIG. 5 shows a processor arrangement having a multi-level cache hierarchy in which a second-level cache is implemented as a crossbar-connected cache, and the processors, memory management circuits, and CCC banks use a cached/uncached designator bit to control caching of a data item between the first-level data cache and the second-level CCC. Some processor architectures allow a programmer to declare data as either cached or uncached. When data is declared as cached, it is eligible for storage in the first and second-level caches when referenced by a processor. When data is declared uncached, the data is not stored in either the first or second-level caches when referenced by a processor. Rather, the uncached data is only stored in the main memory 524. In one embodiment, the cached/uncached designation is used to control the caching of private and shared data. This permits an off-the-shelf multi-core processor or similar processor architecture to be used in combination with a CCC second-level cache configured as described herein to use the cached/uncached designation in controlling the caching of private and shared data.

The processor arrangement of FIG. 5 includes multiple processors, for example, 502 and 504, respective first-level I-caches and D-caches 506, 508, 510, and 512, a CCC, which includes a crossbar switch 514 and CCC banks 516, 518, and 520, and a main memory that is accessed via the memory bus 522.

The processor architecture has two paths to the first-level caches, one path for instructions and the other path for data. For example, processor 502 has path 532 for instructions and path 534 for data. The data path 534 is used for both cached and uncached data.

For cached data, the logic circuitry of the first-level D-cache is involved in cache operations such as lookup and replacement. For uncached data, the cache operations need not be performed. Thus, the logic circuitry that is involved in cache operations can be bypassed for uncached data. The line segment 536 that bypasses first-level D-cache 508 illustrates the bypassing of the cache operations.

In one embodiment, private data (as described above) is declared as cached, and shared data is declared as uncached (as described above). Thus, private data as referenced by processors 502 and 504 will be cached in the first-level D-caches 508 and 512, respectively. Shared data will not be cached in the first-level D-caches. However, shared data may be cached in the CCC banks 516 and 518 through 520 even though it is declared as uncached.

In one embodiment, each of the CCC banks includes a set of control registers (see FIG. 6) in which are stored addresses that are exceptions to the uncached declarations. Thus, an address that is declared as uncached will be stored in a CCC bank if that address is configured in a control register of the CCC bank. An address that is declared as uncached and that is not present in the control registers of the CCC bank will not be cached in the CCC bank.

In different embodiments, the I-cache can be connected to either the CCC by way of the crossbar switch 514 or to the memory by way of the memory bus 522. The dashed lines 552 and 554 represent the alternative connections to the memory bus.

Figure 6:
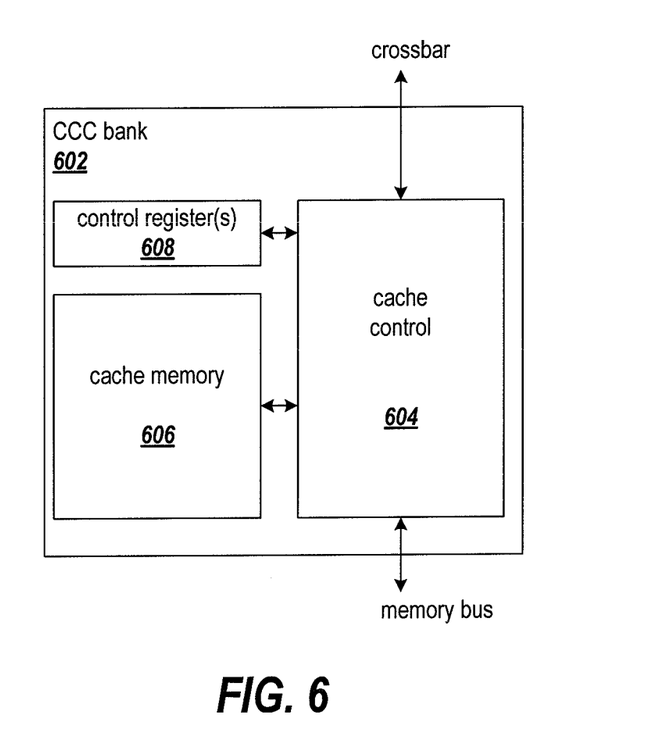
FIG. 6 shows a CCC bank in which control registers are used by the cache control circuit to allow a data item that has been designated as uncached to be cached in the cache memory of the CCC bank.
Figure 7:
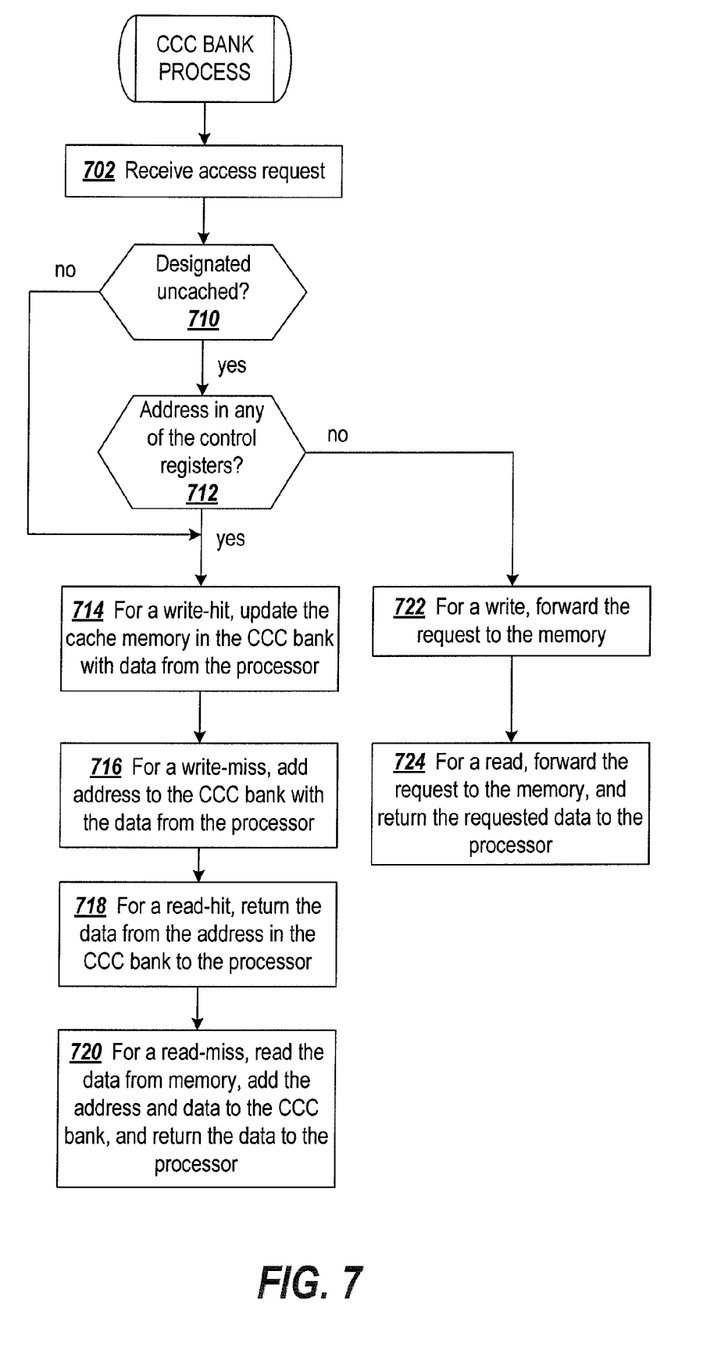
FIG. 7 is a flowchart of an example process performed by the CCC bank in processing an access request from a processor and memory management circuit.

FIG. 6 shows a CCC bank 602 in which control registers are used by the cache control circuit to allow a data item that has been designated as uncached to be cached in the cache memory of the CCC bank. FIG. 7 is a flowchart of an example process performed by the CCC bank in processing an access request from a processor and memory management circuit. The depicted process is not intended to cover all processing performed by a CCC bank. Rather, the figure is intended to illustrate the processing relevant to the processing of requests designated cached or uncached and the caching of referenced data in the CCC bank.

The circuit of FIG. 6 and the process of FIG. 7 are described together. At block 702, the cache control circuit 604 receives an access request. If the access request references an address that is not declared as uncached at decision block 710, block decision block 712 is skipped and the process proceeds to block 714. Otherwise, at decision block 712 the cache control circuit determines whether or not the requested address is present in the control registers 608. If the address is present in a control register, the data declared as uncached is treated as shared data in the CCC, and the process proceeds to block 714.

For a request that is a write-hit, at block 714 the cache memory 606 in the CCC bank is updated with the data from the processor. For a request that is a write-miss, at block 716 the requested address and associated data are stored in the cache memory. In one embodiment, a write-through policy may be implemented in which the data from the processor is immediately updated in the shared memory on a write-hit or a write-miss. In another embodiment, the data in the cache may be stored to shared memory when the data are evicted or in response to program termination.

For a request that is a read-hit, the requested data is read from the cache memory and returned from the CCC bank to the processor at block 718. For a read-miss, at block 720 the request is passed on to the main memory, the requested address and associated returned data are stored in the cache memory, and the data is returned to the processor.

If the requested address is declared to be uncached (decision block 710) and the requested address is not present in any of the control registers (decision block 712), at block 722 a write request is forwarded to the main memory. For a read request, at block 724 the request is forwarded to the main memory, and the data returned from the main memory is returned to the processor.

Figure 8:
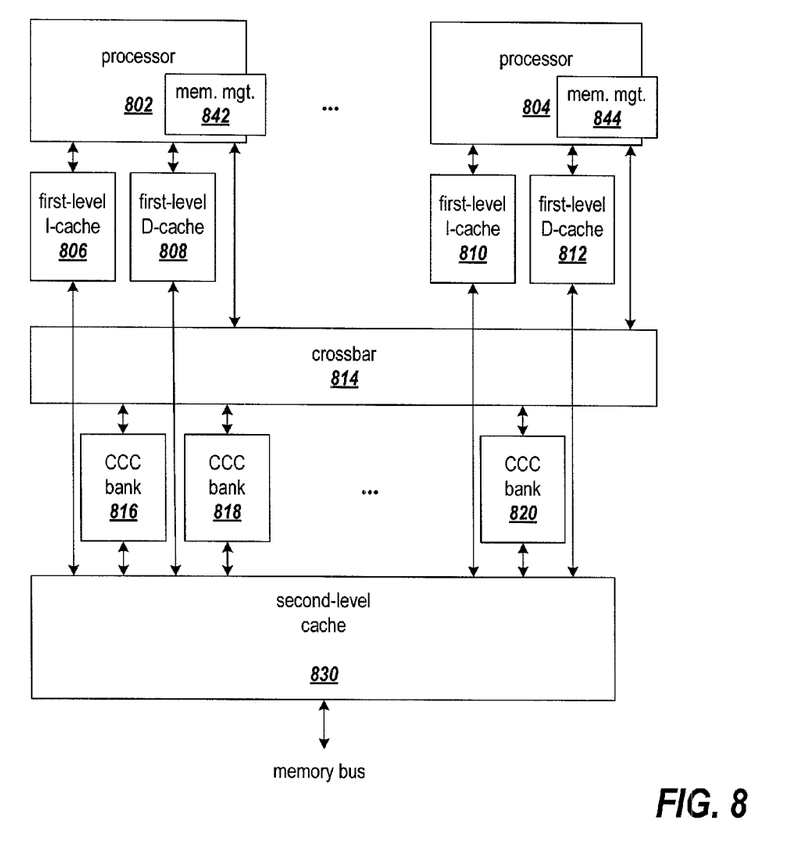
FIG. 8 shows a processor arrangement having a multi-level cache hierarchy in which data shared amongst the processors is cached in a first-level crossbar-connected cache, and private data is stored in respective first-level data caches.

FIG. 8 shows a processor arrangement having a multi-level cache hierarchy in which data shared amongst the processors is cached in a first-level crossbar-connected cache, and private data is stored in respective first-level data caches. Private data and shared data are data as described above.

The processor arrangement includes multiple processors, for example, processors 802 and 804, and respective first-level I-caches 806 and 810. Respective first-level D-caches 808 and 812 are coupled to the processors 802 and 804 and store private data. A CCC, which includes crossbar switch 814 and CCC banks 816 and 818 through 820 is coupled to the processors for first-level caching of shared data. The first-level I-caches, first-level D-caches, and CCC are coupled to second-level cache 830, which is coupled to a memory bus for accessing main memory (not shown).

Private and shared data may be distinguished with a cache control tag as described above. Respective memory management circuits 842 and 844 in the processors 802 and 804 distinguish between private and shared data as described above. Requests for private data are transmitted on the private data paths to the first-level D-caches 808 and 812. Requests for shared data are transmitted on the shared data paths to the crossbar switch 814.

The embodiments are thought to be applicable to a variety of multi-processor systems having first-level and second-level caches. Other aspects and embodiments will be apparent to those skilled in the art from consideration of the specification. It is intended that the specification and illustrated embodiments be considered as examples only, with a true scope of the invention being indicated by the following claims.

What is claimed is:

1. A processor arrangement, comprising:
    a plurality of processors;
    a plurality of first-level instruction caches coupled to the plurality of processors;
    a plurality of first-level data caches coupled to the plurality of processors, respectively;
    at least one second-level cache coupled to the plurality of first-level instruction caches and to the plurality of first-level data caches;
    at least one shared memory coupled to the second-level cache for storing a plurality of data items, each data item having an associated cache control tag; and
    cache control circuitry coupled to the plurality of processors, to the plurality of first-level caches, and to the second-level cache, the cache control circuitry, responsive to a request from one of the plurality of processors for access to a data item, configured to:
        cache the data item in the respective one of the plurality of first-level caches in response to a first value of the cache control tag associated with the data item; and
        cache the data item in the second-level cache and not in any of the plurality of first-level caches in response to a second value of the cache control tag associated with the data item;
    wherein:
        data items with the cache control tag having the first value include constant values, read-only data items, and data items for which only one of the plurality of processors has write access; and
        data items with the cache control tag having the second value include data items for which at least one of the plurality of processors has write access and at least one other of the plurality of processors has read or write access.

2. The processor arrangement of claim 1, wherein the second-level cache is a crossbar-connected cache (CCC).

3. The processor arrangement of claim 2, wherein the CCC is set associative.

4. The processor arrangement of claim 2, wherein the cache control circuitry includes respective memory management circuits coupled to the plurality of processors, each memory management circuit configured to issue the request to either the first-level data cache or to the second-level cache in response to the value of the cache-control tag associated with the data item.

5. The processor arrangement of claim 2, wherein each processor is configured to bypass the respective first-level data cache to access a data item having an associated cache control tag that indicates the addressable item is ineligible for storage in the first-level data cache.

6. The processor arrangement of claim 5, wherein the CCC is configured with the addressing circuitry and includes a set of control registers, and the addressing circuitry is configured to:
cache the data item in the second-level cache in response to the associated bit value indicating the data item is ineligible for storage in the first-level data cache and one of the control registers having an address indicating that the data item is eligible for storage in the CCC; and
not cache the data item in the second-level cache in response to the associated bit value indicating the data item is ineligible for storage in the first-level data cache and none of the control registers having an address indicating that the addressable item is eligible for storage in the CCC.

7. The processor arrangement of claim 2, wherein two or more of the plurality of processors share a respective one of the plurality of the first-level instruction caches.

8. The processor arrangement of claim 2, wherein the plurality of first-level instruction caches includes a respective first-level instruction cache for each one of the plurality of processors.

9. A processor arrangement, comprising:
a plurality of processors;
a plurality of first-level instruction caches coupled to the plurality of processors;
a plurality of first-level data caches coupled to the plurality of processors, respectively;
a crossbar-connected first-level cache coupled to the plurality of processors;
at least one second-level cache coupled to the plurality of first-level instruction caches, to the plurality of first-level data caches, and to the crossbar-connected first-level cache;
at least one shared memory coupled to the second-level cache for storing a plurality of data items, each data item having an associated cache control tag; and
cache control circuitry coupled to the plurality of processors, to the plurality of first-level data caches, to each second-level cache, and to the crossbar-connected first-level cache, the cache control circuitry, responsive to a request from one of the plurality of processors for access to a data item, configured to:
cache the addressable item in the respective one of the plurality of first-level data caches and not in the crossbar-connected first-level cache in response to a first value of the cache control tag associated with the data item; and
cache the addressable item in the crossbar-connected first-level cache and not in any of the plurality of first-level data caches in response to a second value of the cache control tag associated with the data item;
wherein:
data items with the cache control tag having the first value include constant values, read-only data items, and data items for which only one of the plurality of processors has write access; and
data items with the cache control tag having the second value include data items for which at least one of the plurality of processors has write access and at least one other of the plurality of processors has read or write access.

10. The processor arrangement of claim 9, wherein two or more of the plurality of processors share a respective one of the plurality of the first-level instruction caches.

11. The processor arrangement of claim 9, wherein the plurality of first-level instruction caches includes a respective first-level instruction cache for each one of the plurality of processors.

* * * * *